United States Patent

[11] 3,620,861

| [72] | Inventor | George C. Wiswell, Jr.<br>1014 Pequot Road, Southport, Conn. 06490 |
|---|---|---|
| [21] | Appl. No. | 869,550 |
| [22] | Filed | Oct. 27, 1969 |
| [45] | Patented | Nov. 16, 1971 |

[54] CABLE PROTECTION AND METHOD
2 Claims, 5 Drawing Figs.

[52] U.S. Cl. .................................................. 156/53, 170/120
[51] Int. Cl. ........................................................ H01b 13/06
[50] Field of Search ........................................... 156/53, 1.69, 1.71, 172, 184, 185, 186, 278, 280; 174/120, 120.1, 120.4, 121, 121.4

[56] References Cited
UNITED STATES PATENTS

| 2,626,223 | 1/1953 | Sattler et al. | 174/121.4 |
| 2,639,247 | 5/1953 | Squier | 156/53 |
| 3,059,046 | 10/1962 | Westervelt et al. | 174/121 |
| 3,361,593 | 1/1968 | Sattler et al. | 174/120.4 |
| 3,422,215 | 1/1969 | Humes | 156/53 |
| 3,425,865 | 2/1969 | Shelton, Jr. | 174/121 |

Primary Examiner—Benjamin A. Borchelt
Assistant Examiner—H. J. Tudor
Attorney—Smythe & Moore ABSTRACT: A method of placing a protective coating on cables adjacent the splash zone where a first epoxy coating is placed thereon, a porous material wrapped therearound, and a second coating placed thereon after the first has cured on sufficient amount.

PATENTED NOV 16 1971

3,620,861

INVENTOR.
GEORGE C. WISWELL, JR.

BY Smythe & Moore

ATTORNEYS

CABLE PROTECTION AND METHOD

This invention relates to a method of coating communication or power cables to prevent deterioration and particularly to coating of cables which are underwater part of the time.

For the portion of cables completely above water, various types of protective coatings have been used, and such can be examined and easily repaired. The difficulty arises with the portion of the cable which is at the so-called "splash zone." This can be defined as the zone from a predetermined distance below mean low water and a predetermined distance above mean high water. The action of waves, debris, and ice in the water is particularly destructive in the splash zone of the cable and of any coating thereon. Many cables have an interior portion enclosed in a protective metal armor coating which deteriorates.

Attempts have been made to coat cables with resins or plastic coating materials by placing the material by hand upon the cables and then smoothing or spreading by hand the material so placed in order to cover the surface to be protected.

Such has not been satisfactory, because the material cannot be placed uniformly on the surface and it may tend to sag, producing resultant irregularities in thickness.

It previously has been found that certain plastics or resins are particularly efficacious in adhering to underwater structures, these being particularly the epoxies mixed with polyamide curing agents, as will be described hereafter. As mentioned, the difficulty has been in applying these resins or plastics to the structure concerned.

One of the objects of the invention is to provide a method by which cables, underwater or otherwise, can be uniformly coated with a protective coating.

A still further object of the invention is to provide a method of coating cables at the splash zone efficiently and with a minimum of time and cost.

In one aspect of the invention, the armor coating is stripped from the cable and the exposed lead sheath thoroughly cleaned. This could be done by sandblasting. The epoxy resin and curing agent is then mixed and placed on the cleaned portion and adjacent the terminal portion of the cleaned area. Immediately, and before the resin cures, a porous flexible material, such as fiberglass cloth, is wrapped around the resin. After the first coat has cured, a second coating of resin is spread over the first. If desired, the coating could be placed over at least a part of the armor coating of the cable.

These and other objects, advantages and features of the invention will become apparent from the following drawings and description which are merely exemplary.

Figure 1:
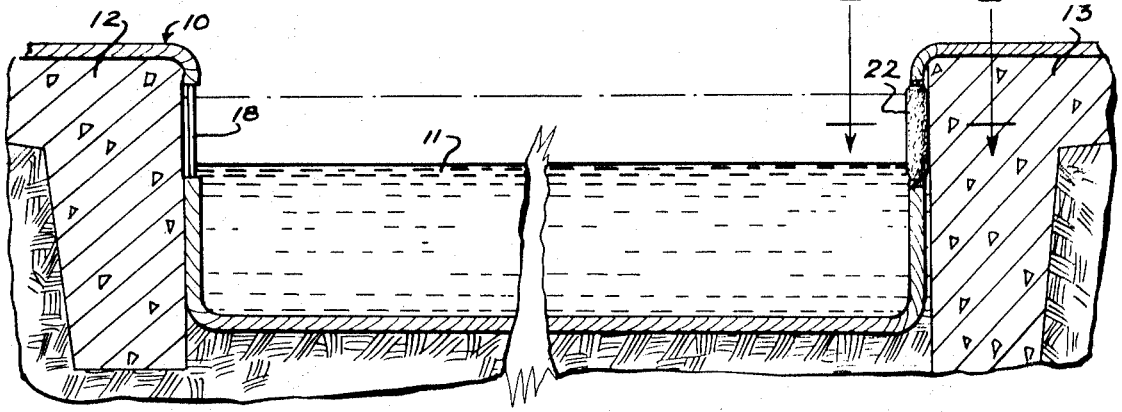
FIG. 1 is a diagrammatic sectional view showing use of the invention.

In FIG. 1, a communication or other cable is shown crossing a stream 11 between banks 12, 13. The cable normally has a core 14 consisting of a plurality of telephone or other wires. Lead, or similar material, shield 15 encloses the wires. A conventional armor coating 16, composed of laid wires along the cable length, encloses the assembly. There is a layer of jute 17, or similar material, between the armor 16 and the lead sheath 15.

In one form, and where there is a protective armor, the armor can be stripped and the lead cleaned by sandblasting or other manners as illustrated at 18 in FIG. 1. If desired, a clamp (not shown) can enclose the armor wires adjacent their termination.

The preferred coating to be employed is an epoxy resin and a curing agent sold under the trademark "Brolite Synflex Under Water Mastic Coating, No. A788 Splash Zone Compound (Two Components)" by Andrew Brown Co., Laurel, Maryland. One, or the first component, is a liquid epoxy resin without diluent, the viscosity of one form being 10,000–20,000 centipoises at 73° F., the epoxide equivalent weight being 175–210 and the hydroxyl equivalent weight being 85. It is to be understood that other suitable epoxies can be used. The other, or second component, is the curing agent which is an amine-terminated polyamide resin. Approximately an equal quantity of resin and curing agent is placed on a table and mixed together for a predetermined time so as to be at the proper curing point before transfer to the cable.

The mixed epoxy coating is then smoothed onto the cleaned cable, the first coat being shown at 19.

After the first layer of epoxy is placed on the lead sheath of the cable or over at least a portion of the armor, a porous synthetic wrapping fabric 20 is wrapped around and onto the first epoxy coating before it cures. The fabric can be in the form of a fiberglass screen. It should be a material to which the epoxy will adhere.

The first coating is allowed to cure for a predetermined time, for example, 24 hours. The time for such will depend upon conditions and the epoxy used.

A second coating 21, similar to the first, is then smoothed over the first coating and wrapped material. As a result, any depressions or uneven areas will be smoothed out. Also, for some reason, a strong composite coating capable of protecting the cable will result. Such will greatly increase the life of the cable even after it has deteriorated at its surface.

Figure 2:
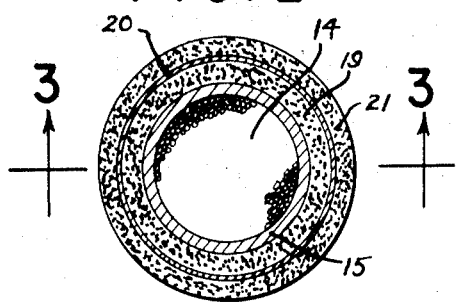
FIG. 2 is an enlarged sectional view along the line 2—2 of a cable coated in accordance with the invention.
Figure 4:
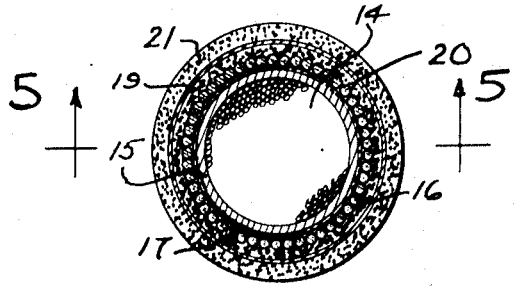
FIG. 4 is similar to FIG. 2 except the wires of the armor have been covered.
Figure 3:
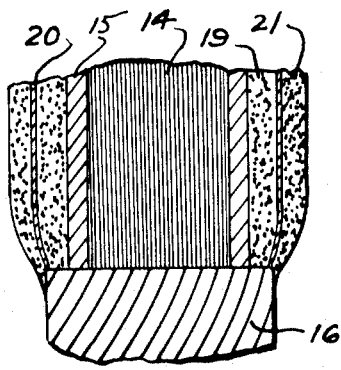
FIG. 3 is a fragmentary sectional view taken along the line 3—3 of FIG. 2.
Figure 5:
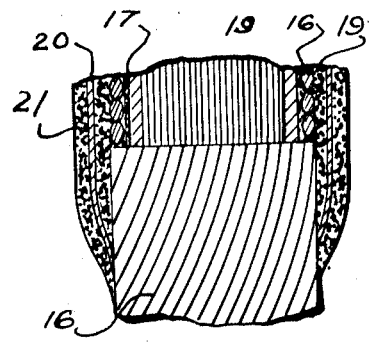
FIG. 5 is a fragmentary sectional view taken along the line 5—5 of FIG. 4.

In FIGS. 2 and 3, the coating is illustrated as being placed directly over the lead sheath. FIGS. 4 and 5 show the coating placed over the armor wire structure. In FIG. 1, a coated portion 22 of the cable is seen.

It should be apparent that variations may be made in details of the process and the materials used without departing from the spirit of the invention, except as recited in the appended claims.

What is claimed is:

1. The method of protecting communication and power cable, or the like, having a casing enclosing interior electric conduits, said casing including a lead sheath at least originally covered by an armor casing, comprising the steps of removing any of the armor casing where the cable is to be protected, cleaning the exterior of the cable portion to be protected, mixing epoxy resin and polyamide curing agent for a predetermined time, spreading the mixed resin material along the cable surface to be protected to form a first coat, then wrapping a flexible porous sheet material around the resin on said cable, allowing said first resin coat to cure, and then spreading a second coat of said mixed resin material over said first coating and flexible porous sheet material.

2. The method of protecting communication and power cable, or the like, having a casing enclosing interior electric conduits, said casing including an armor casing portion enclosing a lead sheath, comprising the steps of removing the armor casing portion, cleaning the exterior of the cable portion to be protected, mixing epoxy resin and polyamide curing agent for a predetermined time, spreading the mixed resin material along the cable surface to be protected to form a first coat, then wrapping a flexible porous sheet material around the resin on said cable, allowing said first resin coat to cure, and then spreading a second coat of said mixed resin material over said first coating and flexible porous material.

* * * * *